United States Patent [19]
Robinson et al.

[11] Patent Number: 6,038,058
[45] Date of Patent: Mar. 14, 2000

[54] GRID-ACTUATED CHARGE CONTROLLED MIRROR AND METHOD OF ADDRESSING THE SAME

[75] Inventors: William P. Robinson, Thousand Oaks; Michael J. Little, Woodland Hills; Eric A. Gifford, Newbury Park, all of Calif.

[73] Assignee: MEMSolutions, Inc., Westlake Village, Calif.

[21] Appl. No.: 09/172,614

[22] Filed: Oct. 15, 1998

[51] Int. Cl.⁷ .................................................. G02B 26/08
[52] U.S. Cl. ........................ 359/293; 359/223; 359/224; 359/298; 348/781; 348/782
[58] Field of Search ..................... 359/293, 298, 359/223, 224; 348/781, 782

[56] References Cited

U.S. PATENT DOCUMENTS

| | | | |
|---|---|---|---|
| 2,276,359 | 3/1942 | Von Ardenne | 359/293 |
| 3,517,126 | 6/1970 | Yamada et al. | 178/7.5 |
| 3,600,798 | 8/1971 | Lee | 29/592 |
| 3,667,830 | 6/1972 | Rottmiller | 359/293 |
| 3,678,196 | 7/1972 | Roth | 178/7.5 D |
| 3,746,911 | 7/1973 | Nathanson et al. | 315/21 R |
| 3,886,310 | 5/1975 | Guldberg et al. | 178/7.5 D |
| 3,896,338 | 7/1975 | Nathanson et al. | 315/373 |
| 4,229,732 | 10/1980 | Hartstein et al. | 340/378.2 |
| 4,387,964 | 6/1983 | Arrazola et al. | 350/331 R |
| 4,441,791 | 4/1984 | Hornbeck | 350/360 |
| 4,592,628 | 6/1986 | Altman et al. | 350/486 |
| 4,615,595 | 10/1986 | Hornbeck | 353/122 |
| 4,680,579 | 7/1987 | Ott | 340/783 |
| 4,698,602 | 10/1987 | Armitage | 332/7.51 |
| 4,710,732 | 12/1987 | Hornbeck | 332/7.51 |
| 4,728,174 | 3/1988 | Grinberg et al. | 350/334 |
| 4,744,636 | 5/1988 | Haven et al. | 350/331 R |
| 4,765,717 | 8/1988 | Buzak et al. | 350/331 R |
| 4,784,883 | 11/1988 | Chitwood et al. | 428/1 |
| 4,786,149 | 11/1988 | Hoenig et al. | 350/356 |
| 4,805,038 | 2/1989 | Seligson | 358/296 |
| 4,826,293 | 5/1989 | Grinberg et al. | 350/331 R |
| 4,884,874 | 12/1989 | Buzak et al. | 350/336 |
| 4,956,619 | 9/1990 | Hornbeck | 330/4.3 |
| 5,083,857 | 1/1992 | Hornbeck | 359/291 |
| 5,142,405 | 8/1992 | Hornbeck | 359/226 |
| 5,172,262 | 12/1992 | Hornbeck | 359/223 |
| 5,196,767 | 3/1993 | Leard et al. | 315/349 |
| 5,280,277 | 1/1994 | Hornbeck | 345/108 |
| 5,287,215 | 2/1994 | Warde et al. | 359/293 |
| 5,416,514 | 5/1995 | Janssen et al. | 348/196 |
| 5,442,414 | 8/1995 | Janssen et al. | 353/98 |
| 5,444,566 | 8/1995 | Gale et al. | 359/291 |
| 5,448,314 | 9/1995 | Heimbuch et al. | 348/743 |
| 5,452,024 | 9/1995 | Sampsell | 348/755 |
| 5,471,341 | 11/1995 | Warde et al. | 359/293 |
| 5,493,439 | 2/1996 | Engle | 359/292 |
| 5,504,614 | 4/1996 | Webb et al. | 359/223 |
| 5,508,738 | 4/1996 | Janssen et al. | 348/196 |
| 5,552,925 | 9/1996 | Worley | 359/230 |

(List continued on next page.)

OTHER PUBLICATIONS

J.A. van Raalte, "A New Schlieren Light Valve for Television Projection," Applied Optics vol. 9, No. 10. (Oct. 1970), p. 2225.

R. Noel Thomas et al., "The Mirror–Matrix Tube: A Novel Light Valve for Projection Displays," IEEE Transactions on Electron Devices, vol. ED–22, No. 9, Sep. 1975, p. 765.

Primary Examiner—Georgia Epps
Assistant Examiner—Margaret Burke
Attorney, Agent, or Firm—Fleshner & Kim

[57] ABSTRACT

A micromirror light valve target configuration that overcomes the problems of limited deflection range, electrostatic and resolution by forming the secondary electron collector grid of a fine conductive mesh and placing it in close proximity to the micromirror array. The source, preferably a fixed beam array, addresses the micromirror array such that it exhibits a secondary emission coefficient less than one to write a negative charge pattern onto the mirrors so that they are attracted to the collector grid. If the anode is also in close proximity to the array, the mirrors can be addressed so that they deflect up toward the grid and down toward the anode thereby increasing the deflection range.

21 Claims, 2 Drawing Sheets

U.S. PATENT DOCUMENTS

| | | | |
|---|---|---|---|
| 5,557,177 | 9/1996 | Engle | 315/366 |
| 5,567,334 | 10/1996 | Baker et al. | 216/24 |
| 5,579,151 | 11/1996 | Cho | 359/291 |
| 5,600,383 | 2/1997 | Hornbeck | 348/771 |
| 5,631,782 | 5/1997 | Smith et al. | 359/871 |
| 5,650,881 | 7/1997 | Hornbeck | 359/871 |
| 5,669,687 | 9/1997 | Yang | 353/98 |
| 5,677,784 | 10/1997 | Harris | 359/290 |
| 5,706,061 | 1/1998 | Marshall et al. | 348/743 |
| 5,768,009 | 6/1998 | Little | 359/293 |
| 5,774,196 | 6/1998 | Marshall | 348/743 |

GRID-ACTUATED CHARGE CONTROLLED MIRROR AND METHOD OF ADDRESSING THE SAME

BACKGROUND OF THE INVENTION

1. Field of the Invention

This invention relates to beam-addressed light modulators and more specifically to light valve targets comprising dense arrays of electrostatically actuated micromirrors.

2. Description of the Related Art

Beam-addressed light modulators use a scanning electron gun to write a charge pattern onto the pixelized beam-addressing surface of a light valve target. The target imparts a modulation onto a light beam in proportion to the pixel intensities and directs the modulated light beam through projection optics to form an image. Such beam-addressed light valve targets have been demonstrated using transmissive and reflective liquid crystals, reflective membranes and micromirror arrays.

Most of these targets utilize secondary electron emission characteristics to write the charge pattern. As shown in FIG. 1, the addressing surface is characterized by a secondary electron emission curve 2 that plots the emission coefficients $\delta$, i.e. the ratio of emitted secondaries to incident primaries, against the landing energy of the primary electrons. At landing energies between first and second crossover points ($\delta=1$), 4 and 6, the surface exhibits a coefficient greater than one. Outside that region, the surface exhibits a coefficient less than one. In general, clean conductors have coefficients less than one and insulators have coefficients greater than one for useful beam energies.

The electron gun emits primary electrons that strike the target's addressing surface with a landing energy above the first crossover causing more secondary electrons to be ejected than incident primary electrons. The secondaries are collected by a collector grid, which is an open conductive mesh that is preferably spaced about ten times the pixel size away from the addressing surface and aligned to it, so as to not interfere with the scanning electron beam. During writing, the grid is held at a relatively positive potential with respect to the addressing surface to collect the secondary electrons. The charge pattern is written onto the surface by modulating the beam current. During erasure, the grid potential is switched to the anode potential so that the secondaries redeposit themselves on the addressing surface.

In the early 1970s, Westinghouse Electric Corporation developed an electron gun addressed cantilever beam deformable mirror device, which is described in R. Thomas et al., "The Mirror-Matrix Tube: A Novel Light Valve for Projection Displays," ED-22 IEEE Tran. Elec. Dev. 765 (1975) and U.S. Pat. Nos. 3,746,911, 3,886,310 and 3,896,338. A low energy scanning electron beam deposits a charge pattern directly onto cloverleaf shaped mirrors causing them to be deformed toward a reference grid electrode on the substrate by electrostatic actuation. Erasure is achieved by raising the target voltage to equal the open field mesh, i.e. collector grid, potential while flooding the tube with low energy electrons to simultaneously erase all of the mirrors. This approach increases the modulator's contrast ratio but produces "flicker", which is unacceptable in video applications.

More recently Optron Systems, Inc., as described in Warde et al., U.S. Pat. No. 5,287,215, has developed a membrane light modulation system in which a charge transfer plate (CTP) couples charge from a scanning electron gun under vacuum through to potential wells in atmosphere. A deformable reflecting membrane, which is supported on insulating posts, is electrostatically attracted toward the wells. The CTP serves as a high-density multi-feedthrough vacuum-to-air interface that both decouples the electron beam interaction from the membrane and provides the structural support required to hold off atmospheric pressure.

Warde suggests two ways to write and erase the CTP. The first is very similar to the Westinghouse technique in that the membrane is switched to the collector grid voltage and rescanned to erase the charge pattern, which Warde acknowledges produces image flicker. The second flickerless mode of operation, which Warde refers to as grid-stabilized, applies the video signal to the membrane and fixes the beam current.

Buzak et al, U.S. Pat. Nos. 5,765,717 and 5,884,874 discloses an electron beam addressed liquid crystal light modulator that includes a liquid crystal cell having a target surface, in which a writing electron beam and an erasing electron beam address to provide a display image. The writing and erasing beams sequentially strike preselected locations on the target surface to cause an emission of secondary electrons and, thereby, develop an electrostatic potential at such preselected locations that is applied across the liquid crystal.

A transparent open collector electrode positioned over and above the target surface collects, in a uniform manner, the secondary electrons emitted by all regions of the target surface. A controller circuit sequentially applies first and second potential differences between the target surface and the collector electrode in synchronism with the scanning motion of the writing and erasing beams.

The collector electrode is segmented into four or more electrically isolated segments. As the erase and write guns raster scan the light valve, with the write gun lagging by two segments, the controller switches the potentials on the segments above the erase and write guns to ground and to +300 V with respect to the incident surface. The erase gun secondaries will redeposit themselves over the segment thereby erasing that segment of the charge pattern. The write gun secondaries will be collected by the grid segment thereby writing a new charge pattern. Since both guns operate at energies above the first crossover point, image resolution can be further improved by coating the entire surface of the LCLV with a material such as magnesium oxide (MgO), which exhibits a very high secondary emission ratio, as described in U.S. Pat. No. 4,744,636. The coating acts as a current amplifier, which permits lower beam current for a given charge pattern.

Leard et al., U.S. Pat. No. 5,196,767 discloses an optical signal processor that uses a matrix-addressable field emitter array to supply controlled electron emission to a two-dimensional signal processor element such as a deformable reflective membrane as described in U.S. Pat. No. 4,794,296 or a liquid crystal array. A conductive stabilization grid collects secondary electrons ejected from the signal processor element. The optical signal processor is particularly suited for applications in adaptive optics, optical computing, target recognition, tracking and signal processing and optical communications.

SUMMARY OF THE INVENTION

In view of the above problems, the present invention provides a high-resolution charge controlled mirror (CCM) with increased deflection range and improved electrostatic stability.

This is accomplished by placing the collector grid, which is held at a positive potential with respect to the anode, in close proximity to the micromirror array, and addressing the array such that the mirrors' exhibit a secondary emission coefficient less than one. In this manner, the collector grid collects the secondary electrons and serves as the reference electrode for attracting the mirrors toward the grid. If the anode is also in close proximity to the micromirror array, the mirrors can be addressed so that their emission coefficients are less than one to deflect the mirrors up and greater than one to deflect the mirrors down. In the preferred embodiment, the target is addressed with an array of fixed beams that are aligned with a fine mesh collector grid and the underlying micromirror array.

Electrostatic instability is addressed by placing a conductive pad on the substrate beneath and in electrical contact with the mirror. This effectively shields the mirrors from any attractive forces from the anode or static charge that may accumulate on the display. When the mirrors are deflected in both directions, a hole in the conductive pad allows the mirror to see the anode potential. However, should the mirror snap over, it will contact the conductive pad. Because they are at the same potential there is no electrostatic attraction, which implies no mechanical pressure forcing the two surfaces together. This provides minimum perturbation of the materials' electron clouds, which shield the nuclii leading to minimized Van der Waals forces. Furthermore, since the maximum positive potential on the micromirror is determined by the collector grid potential, the CCM can be configured so that the snap-over threshold potential is greater than the maximum mirror potential.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a charge controlled mirror (CCM) configuration that overcomes the problems of limited deflection range, electrostatic instability and resolution associated with known electrostatically-actuated analog micromirror targets. This is accomplished by placing the secondary electron collector grid in close proximity to the micromirror array. The collector grid is either formed from a fine mesh that is aligned with the mirror array or a very thin membrane that can be penetrated by the incident primary electrons. The source, preferably a fixed beam array, operates at a landing energy where the mirrors' secondary emission coefficient is less than one to write a negative charge pattern onto the mirrors so that they are attracted to the collector grid. If the anode is also in close proximity to the array, the mirrors can be addressed so that they are selectively deflect toward the grid and the anode.

Figure 1:
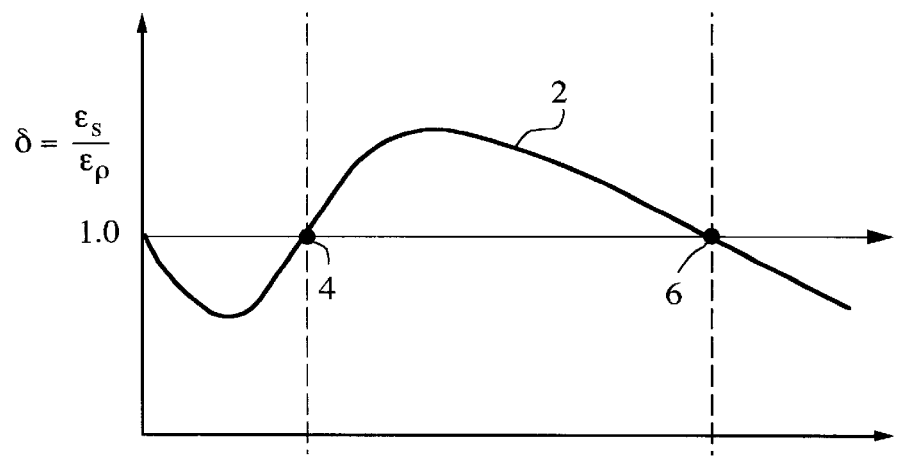
FIG. 1, as described above, is a plot of a secondary electron emission response for a CCM surface.
Figure 2:
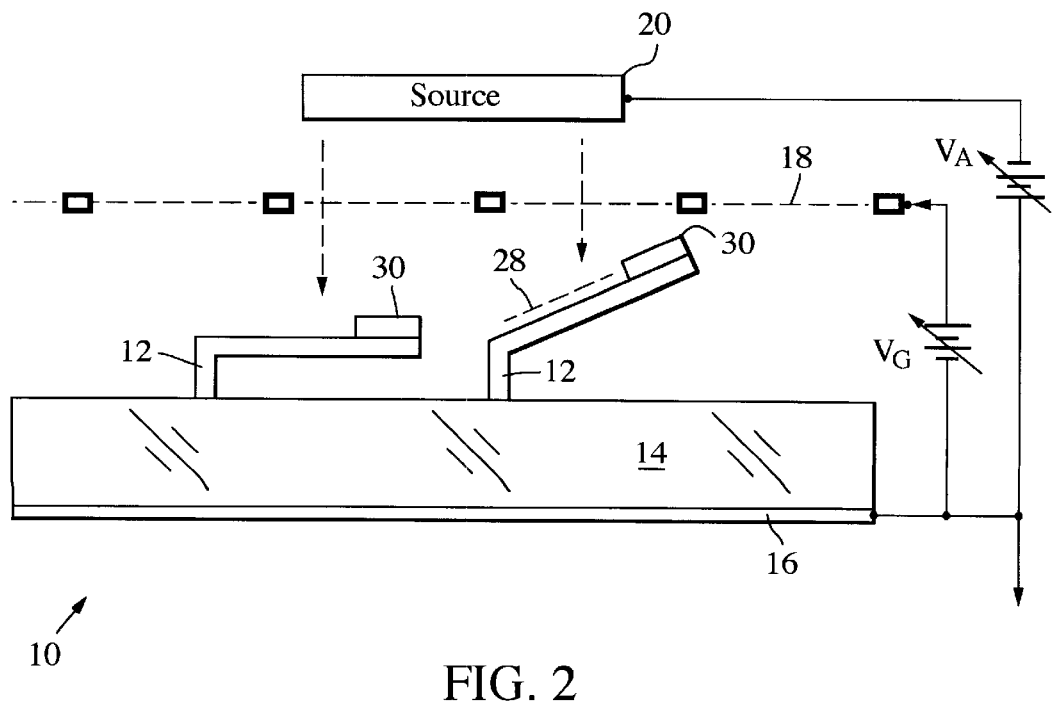
FIG. 2 is a schematic diagram of a grid-actuated CCM in accordance with the present invention.

As shown in FIG. 2, the CCM 10 includes an array of electrically isolated micromirrors 12 on a transparent substrate 14, suitably 2–5 mm thick. An anode electrode 16, shown here on the opposing surface of substrate 14, is held at anode potential. A collector grid 18 is suspended above micromirrors 12, suitably 10–20 microns, and biased with a positive potential $+V_G$ with respect to the anode potential. The potential difference establishes a uniform electric field around micromirrors 12. In effect, the collector grid has a net positive charge Q and the anode electrode has an equal but opposite charge –Q.

In the absence of any deposited charge, the mirror potential stabilizes at a potential between the anode potential and the grid potential such that it satisfies the electric field between the anode and the grid. The exact value of the mirror potential depends on the geometry of the collector grid and anode and their relative spacing to the micromirror. Although the net charge on each micromirror is zero, the free electrons in the conductive mirror metal will distribute themselves so that an amount of negative charge –Q will reside on the top surface of the mirror and an equal amount of positive charge Q will reside on the underside of the mirror. The charge disparity produces an electric field that cancels the uniform electric field so that the electric field inside the conductive mirror is zero and produces equal and opposite attractive forces on the micromirror. Since the net force is zero the micromirror does not move.

A source 20 emits primary electrons that are accelerated through collector grid 18 towards the anode potential $V_A$ and strike micromirrors 12 causing secondary electrons to be ejected and collected by collector grid 18. In the case of a fine mesh, the electrons are directed through the holes in the mesh. If the collector grid is a thin membrane, the electrons penetrate through the membrane to strike the mirrors. The net charge on the micromirrors can be driven positive by operating between the mirror's first and second crossovers and negative by operating outside that region. The beam current and emission coefficient together determine the amount of charge.

When the source writes a charge pattern 28 onto micromirror 12, the charge seeks the lowest potential state on the surface of the micromirror. If the net charge is negative, the charge will reside on top of the micromirror opposite collector grid 18. Conversely if the net charge is positive, the charge will reside on the underside of the micromirror opposite the anode potential.

The net charge modulates the mirror potential, which produces a force imbalance on the micromirror that causes it to deflect. Known micromirror targets such as the Westinghouse device, position the micromirrors very close (4–5 microns) to the anode potential, e.g. an anode electrode on the surface of the substrate, and very far away (200 microns) from the open mesh collector grid, and operate above the first crossover so that the mirror is attracted to the substrate. As noted above, this configuration is unstable and has limited deflection range.

As depicted in FIG. 2, collector grid 18 is positioned close enough to the micromirrors, less than one mirror size and suitably 10–20 microns, that landing energies below the first crossover or above the second crossover cause the mirror to be deflected toward the collector grid. To provide an adequate reference, the grid must have a fine spacing. Typically, at least one cell per micromirror. The open conductive mesh used in known targets is not adequate. Although close enough to attract the mirrors, collector grid 18 is sufficiently far away to provide a large deflection range and avoid instability problems. As depicted in this embodiment, the anode is formed on the opposing surface of the substrate, 2–5 mm away from the micromirror array.

One way to erase charge pattern 28 is to raise the mirror potential toward the collector grid potential where it stabilizes at an erase state potential that is slightly higher than the grid potential. The exact difference depends on the low energy spectrum of the secondary electrons and the mirror and grid geometry. This can be accomplished by using a second source of primary electrons that has a different landing energy at which the emission coefficient exceeds one or, as shown in FIG. 2, by addressing a control pad 30 on the mirror that has an emission coefficient greater than one at the same beam energy. The former approach requires a second source and the latter approach requires a source that is capable of subpixel resolutions.

In either case, to write the next charge pattern onto the micromirror, source 20 must first deposit enough negative charge onto the mirrors to offset the positive charge associated with driving the mirrors to the erase state potential. Once the mirrors are neutralized, source 20 can then deposit a negative charge pattern onto the mirrors to produce the attractive forces that deflect the mirrors toward the collector grid.

In theory, the grid-actuated CCM can be implemented using either a scanning electron gun or an array of fixed beams such as a field emitter array (FEA), a Thin Crt, a surface conduction electron (SCE) array or a metal-insulator-metal (MIM) cathode array. However, the close proximity of the collector grid to the micromirror array when combined with the fineness of the mesh raises a number of design issues for the scanning electron gun configuration that are not present with a fixed beam array.

First, the collector grid must be supported so that it does not sag under its own weight or the attractive forces. If the grid is thick enough to support itself, then when the gun is oriented at an oblique angle to address the mirrors at the edge of the array, the sidewalls of the holes in the grid may partially occlude the beam. If the grid is thin enough to avoid this problem, a post array will be required to support the grid and the posts may be in the way. A fixed beam array is simply aligned with the holes in the grid to the micromirror array.

Second, the projection of the beam onto a mirror should be relatively constant for a given beam current. The projection onto the mirror will depend upon the distance to the mirror, the shape of the spot on the mirror, and any occlusion of the beam. The size, shape and placement of the holes in the grid will have to be configured in view of these factors to provide a reasonably constant projection. A fixed beam array, which has no occlusion and the spot size and distance are uniform, requires only a uniform hole pattern.

Lastly, to address the mirrors through the collector grid, the beam spot size will have to be very small. This will necessitate a high-energy gun and thick mirrors to stop the high-energy electrons. Thicker mirrors means thicker hinges to maintain the minimum required mirror resonant frequency, which in turn increases the amount of charge required to deflect the mirrors. Fixed beam arrays can operate at lower landing energies and current levels, which corresponds to thinner mirrors, thinner hinges and better charge and optical efficiencies.

Figure 3:
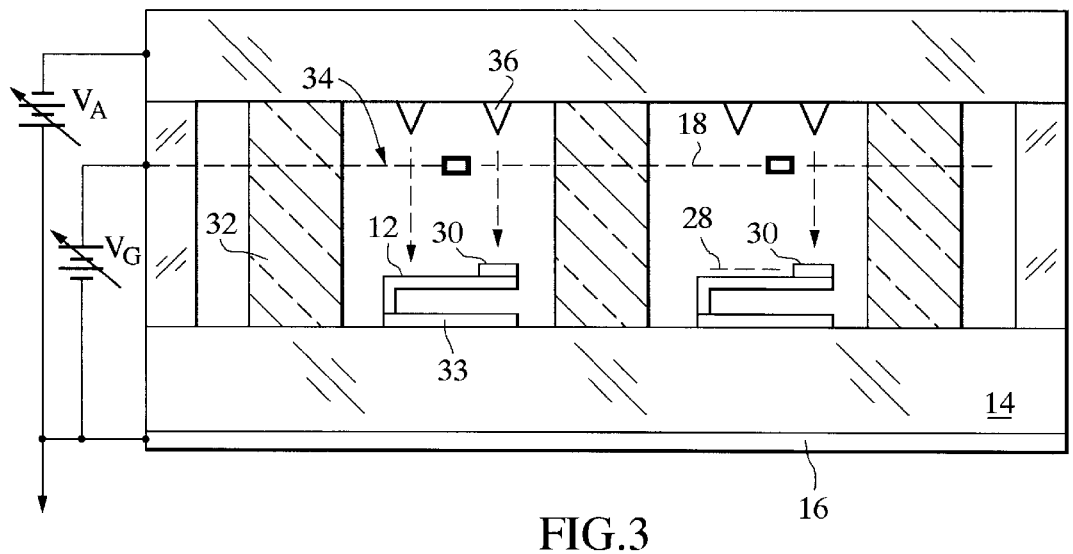
FIG. 3 is a sectional view of an emitter array addressed grid-actuated CCM.

A fixed beam array configuration of the grid-actuated CCM is shown in FIG. 3. Collector grid 18 is supported on an array of insulating posts 32, preferably less than one mirror size and suitably 10–20 microns above micromirrors 12. Each micromirror is preferably supported on a transparent conductive pad 33 that effectively shields the micromirror from any attractive forces that might pull it down to the substrate. Grid 18 is aligned with the micromirror array so that the mirrors and their control pads 30 are aligned with the holes 34 in the grid. Insulating posts 32 are extended to support an array of fixed beam sources 36, e.g. an array of field emitters, which are also aligned with the holes in the grid. Opposite each mirror is at least one source 36 that is aligned with the exposed portion of the mirror and at least one source 36 that is aligned with the control pad.

A modified row-column addressing scheme is used to activate sources 36 to write and erase charge pattern 28 onto the micromirror array. The rows in the fixed beam array are enabled one at a time. Once enabled, the columns opposite the control pads are driven so that the sources emit primary electrons that strike the control pads. This quickly drives the mirror potentials in the row toward the collector grid potential and to the erase state potential. These columns are disabled and the columns opposite the exposed portions of the mirror are driven so that the sources emit primary electrons that strike the mirrors.

The sources are modulated in accordance with the pixel intensity values of the corresponding row in the current video frame to deposit different amounts of negative charge on the mirrors. The negative charge produces an attraction toward the collector grid that deflects the mirror until offset by the spring force of the mirror. The charge is held on the mirror for an entire frame time until that row is readdressed.

Figure 4:
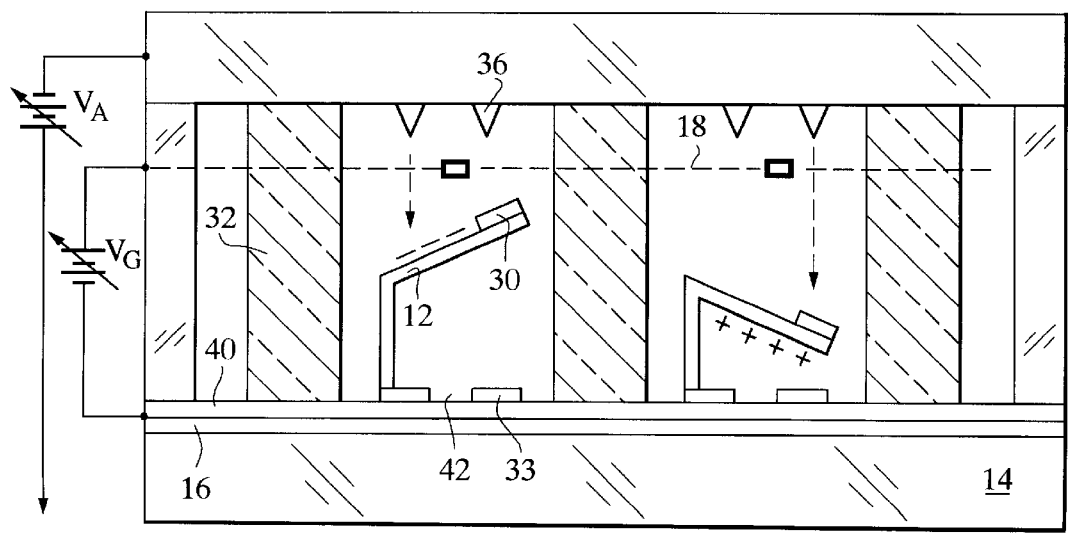
FIG. 4 is a sectional view of an alternate embodiment of an emitter array addressed grid-actuated CCM with increased deflection range.

As shown in FIG. 4, the deflection range of the mirror can be increased by a) increasing the post height of mirror 12 and increasing the grid-to-substrate spacing, b) moving the anode 16 to the micromirror array side of the substrate and forming an insulating layer 40 between anode 16 and the array, and c) forming a hole 42 in each conductive pad 33 beneath the micromirror. Alternately, the anode could be formed as a reference grid on the surface of the substrate. When control pad 30 is addressed, the mirror is not merely erased but is deflected its maximum amount toward the substrate. When the exposed portion of the mirror is addressed, the force balance shifts toward the collector grid and the mirror is deflected back toward the collector grid. To provide symmetry, the maximum deflection in both directions is about the same. This not only doubles the deflection range, but reduces the tendency of certain hinges to develop an offset due to unidirectional stresses to their grain structure over time.

Attracting the micromirrors toward the substrate does raise concern about snap-over and stiction so common in known devices. Should the mirror snap-down it will be in contact with its conductive pad, which is held at the same potential. Although this will not eliminate stiction due to the Van der Waals forces, it will improve the problem. The tradeoff is some amount of charge dilution. Some of the positive charge deposited on the mirror will move to the conductive pad. The larger the hole, the less charge dilution. Furthermore, the mirror potential is approximately bounded by the collector grid potential. The mirror potential may exceed the grid potential slightly due to the low energy spectrum of the secondary electrons and the geometry of the mirrors and collector grid. Therefore, the CCM geometry and bias conditions can be configured such that the threshold voltage for snap-over exceeds the collector grid potential $+V_G$. This prevents snap-over.

While several illustrative embodiments of the invention have been shown and described, numerous variations and alternate embodiments will occur to those skilled in the art. For example, instead of an entire emitter array, a single line of emitters could be stepped in such a manner as to address the grid-actuated CCM and realize similar geometric advantages over scanning guns. Such variations and alternate embodiments are contemplated, and can be made without departing from the spirit and scope of the invention as defined in the appended claims.

We claim:

1. A light modulator, comprising:

an array of electrostatically-actuable micromirrors;

a collector grid that is biased at a grid potential;

an anode electrode spaced apart from said micromirror array opposite said collector grid; and a source that emits primary electrons which accelerate towards the anode electrode, pass through said collector grid and strike the micromirrors thereby ejecting secondary electrons and depositing a negative charge pattern on said micromirrors, said collector grid collecting the ejected secondary electrons and producing attractive electrostatic forces that deflect said micromirrors toward said collector grid in accordance with the difference between said grid potential and the respective micromirror potentials induced by said negative charge pattern.

2. The light modulator of claim 1, wherein said source comprises an array of fixed sources that each emit a beam of primary electrons that strike the micromirror opposite said fixed source.

3. The light modulator of claim 1, wherein said collector grid comprises a fine conductive mesh having at least one cell per micromirror.

4. The light modulator of claim 1, wherein each micromirror is supported on a conductive pad that shields the micromirror from said anode electrode.

5. The light modulator of claim 1, wherein said source selectively deposits said negative charge pattern and a positive charge pattern onto said micromirrors so that they can respectively deflect toward said collector grid and said anode electrode.

6. The light modulator of claim 5, wherein said micromirror has a threshold potential, which if exceeded will cause said micromirror to snap over toward said anode electrode, said collector grid is biased so that said grid potential is less than said threshold potential.

7. The light modulator of claim 1, further comprising a plurality of control pads that partially cover the respective micromirrors and exhibit an electron affinity opposite that of said micromirror.

8. A light modulator, comprising:

an anode that is held at an anode potential;

a collector grid that is spaced apart from said anode, said collector grid being biased at a grid potential above said anode potential to establish a uniform electric field;

an array of electrostatically-actuable micromirrors between said collector grid and said anode and in said uniform electric field, said micromirrors assuming a floating potential at which the opposing attractive forces to said collector grid and said anode cancel;

an array of control pads on said respective micromirrors that exhibit an electron affinity opposite that of said micromirrors, said control pads only partially covering said micromirrors so that each said micromirror has a first portion that has a secondary emission coefficient less than one and a second portion that has a secondary emission coefficient greater than one; and an array of fixed sources that emit primary electrons which are accelerated toward said anode, pass through said collector grid and strike the micromirrors' first and second portions thereby ejecting secondary electrons into said uniform electric field that are collected by said collector grid and leaving a charge pattern on said micromirrors that modulates the micromirrors' floating potentials, said collector grid comprising a fine conductive mesh that is positioned close enough to said array of micromirrors that the change in the micromirrors' floating potentials produces sufficient imbalances in the opposing attractive forces to deflect said micromirrors outward toward said collector grid in accordance with said charge pattern.

9. The light modulator of claim 8, wherein said fine conductive mesh has at least one cell per micromirror.

10. The light modulator of claim 8, wherein each said micromirror is supported on a conductive pad that shields the micromirror from said anode electrode.

11. The light modulator of claim 8, wherein a plurality of said sources direct primary electrons onto said second portions to drive the mirrors' floating potentials toward the grid potential into an erase state and a different plurality of said sources direct primary electrons onto said second portions to reduce the mirrors' floating potentials to respective write states.

12. The light modulator of claim 11, wherein said different plurality of said sources selectively writes negative and positive charge patterns on said micromirrors so that the mirrors are respectively attracted toward said collector grid and said anode electrode.

13. The light modulator of claim 12, wherein each said micromirror has a threshold potential, which if exceeded will cause said micromirror to snap over toward said anode electrode, said collector grid biased so that said grid potential is less than said threshold potential.

14. A light modulator, comprising:

a transparent substrate;

an anode electrode on said substrate that is held at an anode potential;

an array of electrostatically-actuable micromirrors on said substrate;

a collector grid that is spaced apart from said micromirrors opposite said anode electrode, said collector grid being held at a grid potential above said anode potential to establish a uniform electric around the array of micromirrors, said micromirrors stabilizing at a floating potential at which the opposing attractive forces to said collector grid and said anode electrode cancel; and an array of sources that emit primary electrons which pass through said collector grid and strike the micromirrors thereby ejecting secondary electrons into said uniform electric field that are collected by said collector grid and leaving a charge pattern on said micromirrors that modulates their floating potentials, said collector grid and said anode layer being positioned close enough to said array of micromirrors that the modulation of the micromirrors' floating potentials produces sufficient imbalances in the opposing attractive forces to selectively deflect said micromirrors toward said collector grid and said anode layer when said charge pattern is negative and positive, respectively.

15. The light modulator of claim 14, wherein said collector grid comprises a fine conductive mesh having at least one cell per micromirror.

16. The light modulator of claim 14, wherein said anode electrode comprises a buried layer on said substrate beneath said micromirror array, each said micromirror being supported on a conductive pad that assumes the same floating potential as said mirror, each said conductive pad having a hole through which said anode potential can attract said micromirror.

17. The light modulator of claim 14, wherein said micromirror has a threshold potential, which if exceeded will cause said micromirror to snap over toward said anode electrode, said collector grid is biased so that said grid potential is less than said threshold potential.

18. The light modulator of claim 14, further comprising a plurality of control pads that partially cover the respective micromirrors and exhibit an electron affinity opposite that of said micromirror.

19. A method of addressing a micromirror light modulator having an array of micromirrors positioned between an anode electrode and a collector grid, which is biased at a grid potential above the anode potential, comprising:

directing primary electrons onto said micromirrors to eject secondary electrons and write a negative charge pattern onto said micromirrors;

collecting the secondary electrons to hold the negative charge pattern; and attracting said collector grid in accordance with said negative charge pattern.

20. The method of claim 19, wherein said primary electrons are first directed onto said micromirrors to drive their potentials toward the grid potential and into an erase state, and are then directed to write said negative charge pattern onto said micromirrors.

21. The method of claim 20, wherein said primary electrons are selectively directed to write said negative charge pattern, which attracts some of the micromirrors toward said collector grid, and to write a positive charge pattern, which attracts the remaining micromirrors toward said anode electrode.

* * * * *